United States Patent [19]

Farley

[11] Patent Number: 5,503,742

[45] Date of Patent: Apr. 2, 1996

[54] SHOWER FILTER ASSEMBLY HAVING REVERSIBLE FILTER

[76] Inventor: David K. Farley, c/o Sprite Industries, 1827 Capital St., Corona, Calif. 91720

[21] Appl. No.: 323,379

[22] Filed: Oct. 14, 1994

[51] Int. Cl.⁶ ................................................ B01D 29/96
[52] U.S. Cl. ..................... 210/238; 210/282; 210/446; 210/450; 210/459
[58] Field of Search ................... 210/232, 282, 210/445, 447, 459, 238, 266, 449, 460, 446, 450

[56] References Cited

U.S. PATENT DOCUMENTS

| | | | |
|---|---|---|---|
| 4,824 | 10/1846 | Read | 210/282 |
| 250,331 | 12/1881 | Atwood et al. | 210/446 |
| 261,014 | 7/1882 | McLachlan et al. | 210/447 |
| 663,271 | 12/1900 | Hamilton | 210/282 |
| 1,985,411 | 12/1934 | Houck | 210/238 |
| 2,582,388 | 1/1952 | Mansfield . | |
| 4,933,080 | 6/1990 | Rundzaitis | 210/232 |
| 5,008,011 | 4/1991 | Underwood | 210/282 |
| 5,213,688 | 5/1993 | Robinson | 210/440 |
| 5,300,224 | 4/1994 | Farley | 210/266 |

*Primary Examiner*—Joseph W. Drodge
*Attorney, Agent, or Firm*—James G. O'Neill

[57] ABSTRACT

A shower filter assembly having an in-line reversible filter, changeable by unscrewing two portions of the housing. The housing exterior includes a plurality of gripping means to allow easy opening and closing of the housing and to prevent slippage of the hands of a user gripping the two portions, even when wet. The shower filter assembly includes a separate internal filter element that may be easily inserted into or removed from the shower filter assembly to allow the internal filter element to be easily reversed for longer use.

7 Claims, 1 Drawing Sheet

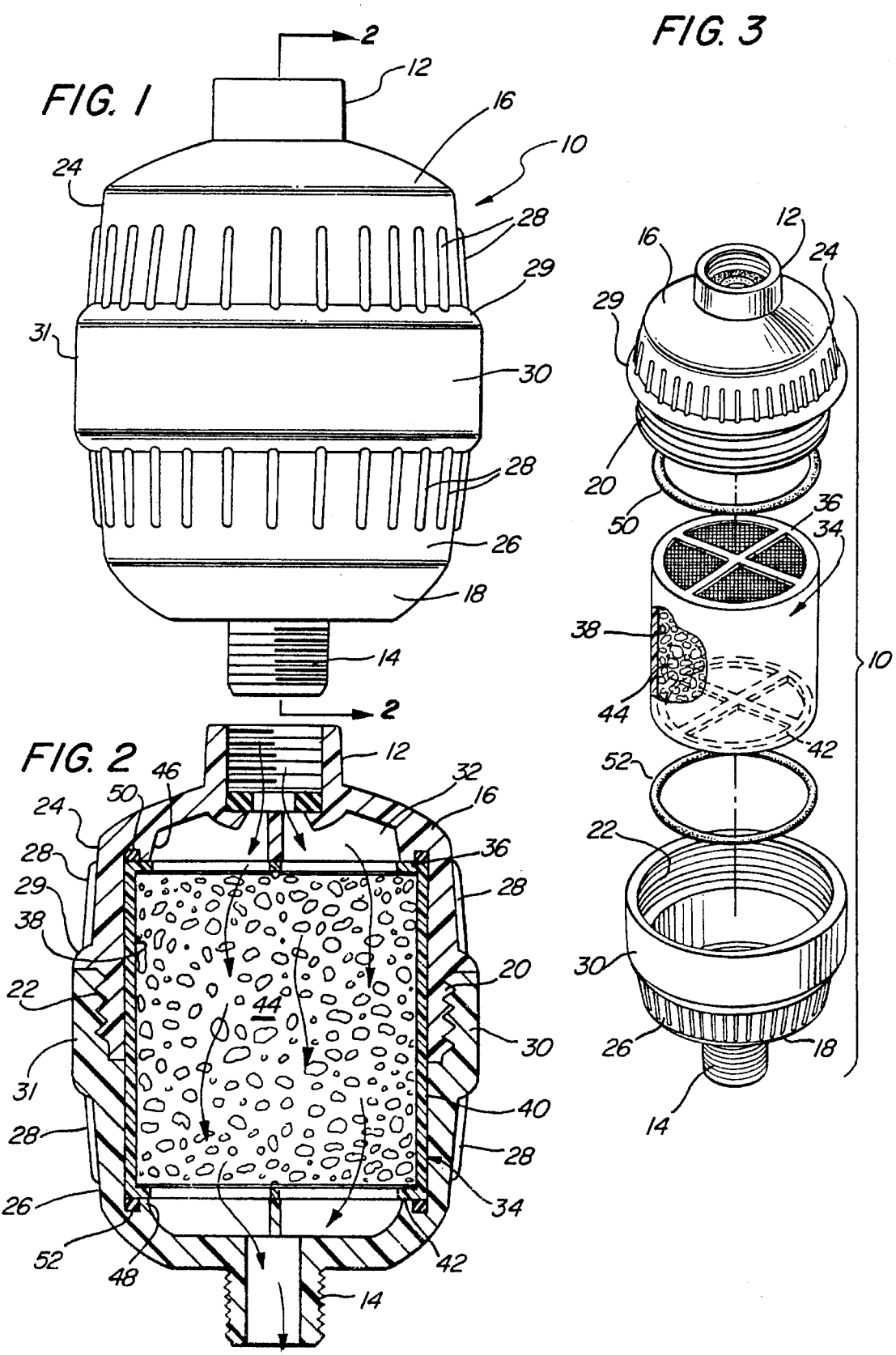

SHOWER FILTER ASSEMBLY HAVING REVERSIBLE FILTER

BACKGROUND OF THE INVENTION

1. Field of the Invention

This invention relates generally to shower water filters and more particularly to an improved, shower water filter assembly which is easily disassembled and reassembled for reversing the water filter element carried therein.

2. Description of Related Art

Water filtering means for attachment to, or for use in conjunction with shower heads are known. These known filtering means may be inserted into a waterline, or replace an existing shower head, to filter water passing therethrough. However, after many attempts to solve the problems of clogging, ease in installation, back flushing and/or replacing the shower filter medium, as well as the high cost of manufacture, there still exists the need for a less cumbersome, easy to install and remove, low-cost shower filter assembly, that is also easily taken apart, to enable the filter element therein to be reversed for back flushing, thereby providing better water filtering capabilities, longer life of the filter element, and less waste.

One known prior art device is shown in U.S. Pat. No. 2,582,388 to Mansfield, which discloses a water filter for attachment to a water faucet having screwed together housings to enable the filter assembly to be opened for recharging the filter material therein. This patent also discusses the ability of the filter to be self-cleaning by reversing the filter on the faucet to reverse the flow of fluid through the same to flush out any impurities contained therein. This filter, however, is not readily adapted for use in a shower head for filtering out the impurities in hot water passing therethrough, and does not present or contemplate the reversing of a separate filter element contained within a shower filter, after unscrewing two portions of a housing.

In U.S. Pat. No. 4,993,080 to Rundzaitis et al., there is disclosed a shower filter having a replaceable filter cartridge. However, the replaceable filter cartridge is supported in a housing which is offset from the water flow, i.e., which is not in-line, thereby requiring direction control and valving means to direct the water from the entering water line into the offset filter cartridge.

U.S. Pat. No. 5,213,688 to Robinson, discloses a shower water filter, for insertion into a waterline, having a laterally displaced, or offset, cavity or compartment for holding a filter element. The filter element may be replaced by unscrewing a canister portion from a base portion, but no mention is made of reversing the filter element.

U.S. Pat. No. 5,300,224 to Farley, discloses a one piece shower water filter/dechlorinator assembly having a removable diverter/screen element at the inlet end to enable filter material to be initially inserted and held in the housing, as well as for recharging the filter, for dechlorinating water passing therethrough.

While the foregoing prior art patents solve some of the problems with the filtration and/or dechlorination of water in showers, they do not overcome all of the known difficulties, such as, but not limited to, problems with taking apart existing shower filters, back flushing of cartridges or filters to clean the same in an attempt to improve their efficiency and to avoid having to replace them as often, ease in manufacture and installation, and the provision of a continued, desired degree of filtration of water passing directly through an in-line device, providing extended filtering capabilities. Furthermore, while the above-mentioned prior art provide some limited improvements in the filtering art, there remains the need in the art for a shower filter assembly that provides a maximum of filtering and other capabilities in an easily opened design, allowing reversal or rotation of an internal filtering element, at a reasonable price.

SUMMARY OF THE INVENTION

Accordingly, it is a general object of the present invention to provide an improved shower filter assembly. It is a particular object of the present invention to provide an easily opened shower filter assembly. It is a still more particular object of the present invention to prove a shower water filter assembly in which an internal filter element to be easily reversed. It is a further object of the present invention to provide a shower water filter that unscrews to allow an internal filter element to be reversed and reinserted for back flushing, as required.

In accordance with one aspect of the invention, there is provided a shower filter assembly having two separate housing members which are easily taken apart to allow an internal filter element to be reversed and reinserted for further use, so as to prevent the shower filter from clogging and limiting the flow of water therethrough. The two separate housing members of the shower filter assembly are provided with easily gripped external surfaces to make it as easy as possible to separate and reattach the housing members.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a side elevational view of the preferred embodiment of the shower water filter assembly of the present invention;

FIG. 2 is a sectional view taken along line 2—2 of FIG. 1, looking in the direction of the arrows; and FIG. 3 is an exploded view of the shower water filter of the present invention, showing the separate housing portions and an internal filter housing containing a filter medium therein which may be removed and/or rotated upon opening thereof.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an improved shower water filter assembly.

It has been found by long use and experiment that there is so much water flowing through the filter material in a shower water filter that the shower filter must be cleaned, i.e., backflushed, and/or the filter material or shower filter actually replaced much more frequently than previously thought. In fact it is now recommended by some shower filter manufacturers that the shower filter be backflushed at least every thirty (30) days. In addition, depending on the quality of the water in a given area, and the temperature of the water flowing through the shower filter, the length of time between backflushing and/or changing may be shortened even further. However, with known shower water filters it is not convenient to backwash the filter and/or change the filter medium.

The device of the present invention provides for an easily opened device in which a shower water filter may have its internal filter, containing the filter media backflushed at regular intervals. Turning now to the drawings, FIGS. 1–3 show a shower water filter assembly 10 of the present invention, adapted to be secured between the outlet end of a shower arm or waterpipe and a shower head (not shown), in a known manner. It will be readily apparent to those skilled in the art that the internally threaded inlet 12 may be secured to the end of a shower arm, or the like, while the exteriorly threaded outlet end 14 may be secured to the inlet of a shower head. The inlet 12 is secured to, or preferably formed integrally with, a first half of a body of a shower filter, comprising a top or male portion 16. The top portion 16 is capable of being inserted and held in a second half of a body of a shower filter, comprising a bottom or female portion 18, having the outlet 14 secured to, or preferably formed integrally therewith.

The top portion 16 includes a securing means, such as an annular threaded lower portion 20, which cooperates with and is securely held in a further securing means, such as an internally threaded annular upper portion 22 of bottom portion 18. The annular internal threads of bottom portion 22 are secured to the annular threaded lower portion 20, in any desired manner, such as by a user holding onto a gripping area 24, 26 formed on the external surfaces of both the top portion 16 and bottom portion 18 and screwing the portions into each other. To allow the top and bottom portions to be more easily gripped and turned, gripping or non-slip means, such as a plurality of ribs 28 are formed integrally with the top and bottom portions 16, 18, in reduced diameter gripping areas 24, 26.

As shown, the assembly 10 is preferably substantially cylindrical in shape with substantially domed ends. The top portion 16 includes a raised lip 29 below gripping area 24, while bottom portion 18 includes a raised skirt, or the like 30, formed above the gripping area 26. Therefore, when the top and bottom portions 16 and 18 are screwed together, raised lip 29 and raised skirt 30 cooperate to form a raised central area 31 on the assembly 10, as shown in FIGS. 1 and 2. In use, the raised lip 29 will prevent water from entering between the assembled top and bottom portions.

When the top and bottom portions 16, 18 are assembled, an internal, hollow filter chamber 32 is contained within the assembly 10 and is bounded by the top and bottom portions. A filter element 34 is captured within the internal chamber 32, and includes a substantially flat, circular top wall 36, having a screen or the like therein to allow water from the inlet 12, to flow in the direction of the arrows, through the same, into an inner chamber 38 formed by an annular side wall 40. A substantially flat, circular bottom wall 42 having a further screen therein is secured to the other end of annular wall 40 to allow water to flow out the outlet 14 after having passed through filter media in the filter element 34. The walls 36, 40 and 42 of the filter element 34 are secured together in any desired manner, such as by being permanently bonded together with any desired filter media 44 filling inner chamber 38.

The upper and lower portions 16 and 18 of assembly 10 may be fabricated in any desired manner, using any acceptable material, such as by molding a plastic material to form the two portions in such a manner that they are sized and dimensioned so as to be capable of being easily sealingly screwed together and apart.

In use, the filter element 34 is first assembled with filter media 44 therein, and inserted into one of the upper and lower portions 16 and 18. These portions are then screwed together until the filter element 34 is securely held in chamber 32, between internal wall means 46, 48. To prevent water from bypassing the filter element 34 in the internal chamber 32, sealing means, such as o-ring seals 50, 52, are inserted and held in annular openings formed in each of the internal wall means 46, 48.

After having been used for a predetermined period of time in a shower, depending on the water being used, the filter media 44 in the filter element 34 will become partially blocked or clogged, thereby loosing its effectiveness and slowing down the flow of water through the shower filter assembly 10. However, the upper and lower portions 16 and 18 may then be easily screwed apart, with the upper portion still attached to the shower arm, by gripping the gripping areas 24 and 26 and turning the same so as to separate the top and bottom portions and open the internal chamber 32. The filter element 34 may then be easily removed and reversed, i.e., turned 180 degrees, and the portions 16 and 18 screwed back together with the filter element 34 in this reversed position. Further flow of water through the reassembled filter, with the filter element 34 in the reversed position, will backflush the filter media 44 in the filter element to provide continued efficient use of the filter media in the filter element, and thereby provide for a longer useful life thereof, as well as the elimination of waste, some of it toxic, as occurs with current filters, which require the filter element and/or filter media to be discarded once blocked or clogged.

Accordingly, as will be apparent to those skilled in the art, the assembly of the present invention provides considerable advantages in ease and flexibility of manufacture, as well as the separating of the separate portions of the assembly, and the installation and removal of the filter element contained therein.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What I claim is:

1. An in-line shower water filter assembly comprising, in combination:

a substantially cylindrical hollow body comprised of substantially cylindrical separable top and bottom housing portions having an internal hollow chamber formed therebetween;

the substantially cylindrical separable top housing portion including a first domed end, and a second open end, with a raised lip and an exteriorly threaded male portion adjacent said raised lip at said second open end, and the bottom housing portion including a first domed end, and a second open end, with a raised skirt and an interiorly threaded female portion adjacent said raised skirt, so that when said separable top and bottom housing portions are screwed together they will form a substantially cylindrical in-line shower water filter having a raised central strengthened area, formed by said raised lip and said raised skirt;

an inlet and an outlet connected to the respective first domed ends of said separable top and bottom housing portions to allow the flow of water into and out of said internal hollow chamber;

a separate filter element mounted within said internal hollow chamber;

said separate filter element being held in said internal hollow chamber and clamped between said separable top and bottom housing portions by internal wall means, and having a top wall, a bottom wall and an annular side wall forming an inner hollow chamber;

a filter media substantially filling said inner hollow chamber of said separate filter element; and said separable top and bottom housing portions having interior and exterior surfaces and including gripping portions formed on the exterior surfaces thereof adjacent said raised lip and said raised skirt, said gripping portions being comprised of a plurality of strengthening ribs which allow said separable top and bottom housing portions to be more easily gripped when screwing them together or taking them apart.

2. An in-line shower water filter assembly comprising, in combination:

a substantially cylindrical hollow body comprised of separable substantially cylindrical top and bottom housing portions having an internal hollow chamber formed therebetween;

an inlet and an outlet connected to respective domed ends of said separable top and bottom housing portions to allow the flow of water into and out of said internal hollow chamber;

a separate filter element mounted within said internal hollow chamber;

said separate filter element being held in said internal hollow chamber clamped between internal wall means formed on said separable top and bottom housing portions, and having a top wall, a bottom wall and an annular side wall forming an inner hollow chamber;

a filter media substantially filling said inner hollow chamber of said separate filter element;

said separable, substantially cylindrical top and bottom housing portions having interior and exterior surfaces and including threaded connecting means, on open ends thereof having enlarged strengthened mating areas, away from the domed ends, enabling said separable, substantially cylindrical top and bottom housing portions to be screwed together and taken apart by turning the same with respect to each other; and gripping portions formed on the exterior surfaces of each of said separable, substantially cylindrical top and bottom portions; each of the gripping portions including a plurality of ribs formed on the exterior surface thereof adjacent to the enlarged, strengthened mating areas, to allow said separable top and bottom housing portions to be more easily gripped when screwing them together or taking them apart.

3. The in-line shower water filter assembly of claim 2 wherein said separable, substantially cylindrical top and bottom housing portions include raised lip and skirt areas which form a raised central area for strengthening said in-line shower filter assembly when it is formed by said screwed together substantially cylindrical top and bottom housing portions.

4. The in-line shower water filter assembly of claim 2 wherein said separable substantially cylindrical top and bottom housing portions include enlarged strengthened mating areas comprised of a raised lip on the top housing portion adjacent a threaded male connection and a raised skirt on the bottom housing portion adjacent an internal threaded connection, so that when said separable substantially cylindrical top and bottom housing portions are screwed together they will form said in-line shower water filter with a raised central strengthened area having a top and a bottom area; and said gripping portions are formed in reduced diameter portions of said in-line shower water filter assembly adjacent said top and bottom areas of said raised central strengthened area.

5. The in-line shower water filter assembly of claim 4 wherein said raised lip of the separable, substantially cylindrical top housing portion is arranged to prevent water from entering into said exteriorly threaded male portion thereof when said in-line shower water filter assembly is mounted in a shower.

6. The in-line shower water filter assembly of claim 4 wherein said threaded male connection and said internal threaded connection are formed so as to provide an in-line shower water filter assembly with substantially equal size separable, substantially cylindrical top and bottom portions.

7. An in-line shower water filter assembly comprising, in combination:

a substantially cylindrical hollow body comprised of separable substantially cylindrical top and bottom housing portions having domed ends and an internal hollow chamber formed between open ends;

an inlet connected to the domed end of said substantially cylindrical top housing portion and an outlet connected to the domed end of said substantially cylindrical bottom housing portion to allow the flow of water into and out of said internal hollow chamber;

a separate filter element mounted within said internal hollow chamber;

said separate filter element being held in said internal hollow chamber clamped between the domed ends of said separable top and bottom housing portions and having a top wall, a bottom wall and an annular side wall forming an inner hollow chamber;

a filter media substantially filling said inner hollow chamber of said separate filter element;

said separable, substantially cylindrical top and bottom housing portions having interior and exterior surfaces and include threaded connecting means at the open ends thereof enabling said separable, substantially cylindrical top and bottom housing portions to be screwed together and taken apart by turning the same with respect to each other;

gripping portions formed on the exterior surfaces of each of said separable, substantially cylindrical top and bottom portions; each of the gripping portions including a plurality of strengthening ribs formed on the exterior surface thereof adjacent to enlarged strengthened mating areas, to allow said separable top and bottom housing portions to be more easily gripped when screwing them together or taking them apart; and the enlarged, strengthened mating areas of said separable substantially cylindrical top and bottom housing portions including a raised lip on the top housing portion adjacent a threaded male connection and a raised skirt on the bottom housing portion adjacent an internal threaded connection, so that when said separable substantially cylindrical top and bottom housing portions are screwed together said in-line shower water filter will be formed with a raised central strengthened area having a top and a bottom area.

* * * * *

(12) EX PARTE REEXAMINATION CERTIFICATE (5173rd)
United States Patent
Farley

(10) Number: US 5,503,742 C1
(45) Certificate Issued: Aug. 9, 2005

(54) SHOWER FILTER ASSEMBLY HAVING REVERSIBLE FILTER

(75) Inventor: David K. Farley, c/o Sprite Industries, 1827 Capital St., Corona, CA (US) 91720

(73) Assignee: David K. Farley, Corona, CA (US)

Reexamination Request:
No. 90/006,705, Jun. 27, 2003

Reexamination Certificate for:
Patent No.: 5,503,742
Issued: Apr. 2, 1996
Appl. No.: 08/323,379
Filed: Oct. 14, 1994

(51) Int. Cl.[7] .................. B01D 24/10; B01D 24/46; B01D 27/08; B01D 29/96
(52) U.S. Cl. .................. 210/238; 210/232; 210/282; 210/446; 210/449; 210/450; 210/459
(58) Field of Search .................. 210/238, 282, 210/446, 450, 459, 232

(56) References Cited

U.S. PATENT DOCUMENTS

| | | | |
|---|---|---|---|
| 4,824 A | 10/1846 | Read | |
| 40,620 A | 11/1863 | Halsted | |
| 190,569 A | * 5/1877 | Fleming et al. | 210/317 |
| 277,203 A | 5/1883 | Benson | |
| 494,837 A | 4/1893 | Bellamy | |
| 604,931 A | * 5/1898 | Eisendrath | 210/445 |
| 2,321,220 A | * 6/1943 | Lieberman | 210/445 |
| 2,334,802 A | * 11/1943 | Zuckermann | 210/335 |
| 3,083,916 A | 4/1963 | Neel | |
| 3,208,595 A | 9/1965 | Butler | |
| 3,374,895 A | 3/1968 | Krongos | |
| 3,695,450 A | 10/1972 | Lieberman | |
| 3,760,951 A | 9/1973 | Mansfield | |
| 3,780,869 A | 12/1973 | Krongos | |
| 3,789,991 A | 2/1974 | Krongos | |
| 3,822,018 A | 7/1974 | Krongos | |
| 3,875,055 A | 4/1975 | Grosboll et al. | |
| 4,025,438 A | 5/1977 | Gelman et al. | |
| 4,536,290 A | * 8/1985 | Bonazzo | 210/419 |
| 4,678,571 A | 7/1987 | Hosaka et al. | |
| 5,149,437 A | 9/1992 | Wilkinson et al. | |
| D361,622 S | 8/1995 | Farley | |
| 5,503,742 A | 4/1996 | Farley | |

OTHER PUBLICATIONS

*Machinery's Handbook*, 26th Edition (2000), Industrial Press, New York, New York, pp. 270–271.

* cited by examiner

Primary Examiner—Thomas M. Lithgow

(57) ABSTRACT

A shower filter assembly having an in-line reversible filter, changeable by unscrewing two portions of the housing. The housing exterior includes a plurality of gripping means to allow easy opening and closing of the housing and to prevent slippage of the hands of a user gripping the two portions, even when wet. The shower filter assembly includes a separate internal filter element that may be easily inserted into or removed from the shower filter assembly to allow the internal filter element to be easily reversed for longer use.

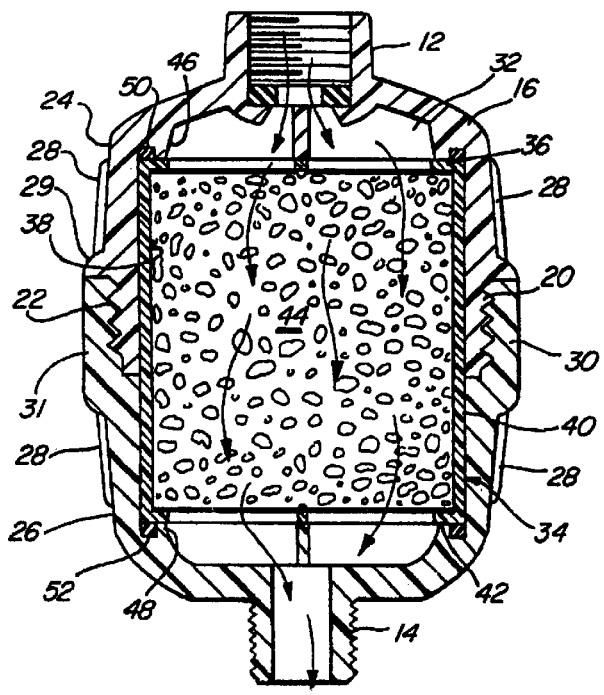

_US 5,503,742 C1_

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE
SPECIFICATION AFFECTED BY AMENDMENT
ARE PRINTED HEREIN.

Column 2, lines 11–19:

Accordingly, it is a general object of the present invention to provide an improved shower filter assembly. It is a particular object of the present invention to provide an easily opened shower filter assembly. It is a still more particular object of the present invention to [prove] *provide* a shower water filter assembly in which an internal filter element [to] *is bi-directional, or may* be easily reversed. It is a further object of the present invention to provide a shower water filter assembly that unscrews to allow an internal filter element to be reversed and reinserted for back flushing, as required.

Column 3, lines 42–51:

As shown, the assembly 10 is preferably substantially cylindrical in shape with substantially domed *internal and external* ends. The top portion 16 includes a raised lip 29 below the gripping area 24, while bottom portion 18 includes a raised skirt, or the like 30, formed above gripping area 26. Therefore, when the top and bottom portions 16 and 18 are screwed together, raised lip 29 and raised skirt 30 cooperate to form a raised central area 31 on assembly 10, as shown in FIGS. 1 and 2. In use, the raised lip 29 will prevent water from entering between the assembled top and bottom portions.

Column 3, lines 52–66:

When the top and bottom portions 16, 18 are assembled, an internal, hollow filter chamber 32 is contained within the assembly 10 and is bounded by the *substantially domed internal ends of* the top and bottom portions. A *bi-directional or reversible* filter element 34 is captured within the internal chamber 32, and includes a substantially flat, circular top wall 36, having a screen or the like therein to allow water from the inlet 12, to flow in the direction of the arrows, through the same, into an inner chamber 38 formed by an annular side wall 40. A substantially flat, circular bottom wall 42, having a further screen therein is secured to the other end of annular wall 40 to allow water to flow out the outlet 14 after having passed through the filter media in the filter element 34. The walls 36, 40 and 42 of the filter element 34 are secured together in any desired manner, such as being permanently bonded together with any desired filter media 44 filling inner chamber 38.

AS A RESULT OF REEXAMINATION, IT HAS BEEN DETERMINED THAT:

The patentability of claims 1–7 is confirmed.

New claims 8–21 are added and determined to be patentable.

8. *The in-line shower water filter assembly of claim 1 wherein said substantially cylindrical separable top and bottom housing portions are easily connected and taken apart so as to allow said separate filter element to be easily removed and reversed for reinsertion back into said internal hollow chamber whereby when said substantially cylindrical separable top and bottom housing portions are connected together again, water flowing through said in-line filter assembly will backflush said reversed separate filter element to clean the same.*

9. *The in-line shower water filter assembly of claim 1 wherein said separate filter element is an in-line assembly that allows water to pass directly through said separate filter element.*

10. *The in-line shower water filter assembly of claim 1 wherein said separate filter element is bi-directional and defines an in-line assembly having a single fluid flow path, which is parallel to a longitudinal axis of the shower filter assembly.*

11. *The in-line shower water filter assembly of claim 2 wherein said substantially cylindrical separable top and bottom housing portions are easily connected and taken apart so as to allow said separate filter element to be easily removed and reversed for reinsertion back into said internal hollow chamber whereby when said substantially cylindrical separable top and bottom housing portions are connected together again, water flowing through said in-line filter assembly will backflush said reversed separate filter element to clean the same.*

12. *The in-line shower water filter assembly of claim 2 wherein said separate filter element is bi-directional and defines an in-line assembly having a single fluid flow path, which is parallel to a longitudinal axis of the shower filter assembly.*

13. *The in-line shower water filter assembly of claim 3 wherein said substantially cylindrical separable top and bottom housing portions are easily connected and taken apart so as to allow said separate filter element to be easily removed and reversed for reinsertion back into said internal hollow chamber whereby when said substantially cylindrical separable top and bottom housing portions are connected together again, water flowing through said in-line filter assembly will backflush said reversed separate filter element to clean the same.*

14. *The in-line water shower water filter assembly of claim 3 wherein said separate filter element is an in-line assembly that allows water to pass axially through said separate filter element.*

15. *The in-line water shower water filter assembly of claim 3 wherein said separate filter element is bi-directional and defines an in-line assembly having a single fluid flow path, which is parallel to a longitudinal axis of the shower filter assembly.*

16. *The in-line water shower water filter assembly of claim 4 wherein said separate filter element is an in-line assembly that allows water to pass axially through said separate filter element.*

17. *The in-line shower water filter assembly of claim 5 wherein said substantially cylindrical separable top and bottom housing portions are easily connected and taken apart so as to allow said separate filter element to be easily removed and reversed for reinsertion back into said internal hollow chamber whereby when said substantially cylindrical separable top and bottom housing portions are connected together again, water flowing through said in-line filter assembly will backflush said reversed separate filter element to clean the same.*

18. The in-line shower water filter assembly of claim 5 wherein said separate filter element is an in-line assembly having a single fluid flow path that is parallel to a longitudinal axis of the shower filter assembly that allows water to pass directly through said separate filter element, and wherein said separate filter element is bi-directional.

19. The in-line shower water filter assembly of claim 6 wherein said substantially cylindrical separable top and bottom housing portions are easily connected and taken apart so as to allow said separate filter element to be easily removed and reversed for reinsertion back into said internal hollow chamber whereby when said substantially cylindrical separable top and bottom housing portions are connected together again, water flowing through said in-line filter assembly will backflush said reversed separate filter element to clean the same.

20. The in-line shower water filter assembly of claim 6 wherein said separate filter element is an in-line assembly that allows water to pass axially through said separate filter element.

21. The in-line shower water filter assembly of claim 7 wherein said substantially cylindrical separable top and bottom housing portions are easily connected and taken apart so as to allow said separate filter element to be easily removed and reversed for reinsertion back into said internal hollow chamber whereby when said substantially cylindrical separable top and bottom housing portions are connected together again, water flowing through said in-line shower water filter assembly will backflush said reversed separate filter element to clean the same; said separate filter element is an in-line assembly having a single fluid flow path that is parallel to a longitudinal axis of the shower filter assembly that allows water to pass axially through said separate filter element, and wherein said separate filter element is bi-directional.

\* \* \* \* \*